Dec. 15, 1964     H. SCHROEDER ETAL     3,161,457
THERMAL PRINTING UNITS
Filed Nov. 1, 1962     5 Sheets-Sheet 1

INVENTORS
HANS SCHROEDER
WILLIAM H. PUTERBAUGH, JR. &
ROBERT C. MECKSTROTH

BY

THEIR ATTORNEYS

Dec. 15, 1964   H. SCHROEDER ETAL   3,161,457
THERMAL PRINTING UNITS

Filed Nov. 1, 1962   5 Sheets-Sheet 2

INVENTORS
HANS SCHROEDER
WILLIAM H. PUTERBAUGH, JR. &
ROBERT C. MECKSTROTH
BY

THEIR ATTORNEYS

United States Patent Office 3,161,457
Patented Dec. 15, 1964

3,161,457
THERMAL PRINTING UNITS
Hans Schroeder, Bellbrook, William H. Puterbaugh, Jr., Waynesville, and Robert C. Meckstroth, Dayton, Ohio, assignors to The National Cash Register Company, Dayton, Ohio, a corporation of Maryland
Filed Nov. 1, 1962, Ser. No. 234,668
23 Claims. (Cl. 346—76)

The present invention relates to printing units and, more specifically, to printing units which provide quiet, high-speed printing on thermally-sensitive record material.

With modern high-speed computers, it is mandatory that high-speed printing apparatus be supplied to receive the information which the computers have processed and prepared for read-out. High-speed printers in current use are largely of the mechanical type which depend upon mechanically, pneumatically, or electrically actuated hammers to strike the type slugs during the printing operation. As a consequence, the attendant noise of these printers may be objectionable. An improved printing apparatus would be one which would print, with a minimum of or no noise, the read-out information as rapidly as it is generated by the computer. Because of the desirability of a printing apparatus which is both high-speed and quiet, it is necessary that the mechanical portions of such a printing apparatus be kept at an absolute minimum.

It is, therefore, an object of this invention to provide an improved high-speed printing unit.

It is another object of this invention to provide an improved high-speed printing unit which requires no mechanical motion to mark a record material.

It is a further object of this invention to provide an improved high-speed printing unit capable of marking upon thermally-sensitive record material.

In accordance with this invention, a printing unit capable of marking a thermally-sensitive record material is provided and is composed of a substrate member of high resistivity material upon at least one surface of which are selectively positioned a plurality of small resistive elements having respective individual electrically-conductive circuits whereby the passage of a short-duration electrical pulse through any of the electrically-conductive circuits produces in the corresponding resistive element a temperature rise of sufficient magnitude to produce a mark on thermally-sensitive record material in cooperative relationship therewith.

For a better understanding of the present invention, together with further objects, advantages, and features thereof, reference is made to the following description and accompanying drawings, in which.

An example of commercially-available thermally-sensitive record material which may be marked by the novel unit of this invention is the thermally-sensitive type of papers manufactured by Minnesota Mining and Manufacturing Company which are marketed under the trademark "Thermo-Fax" paper.

Figure 1A:
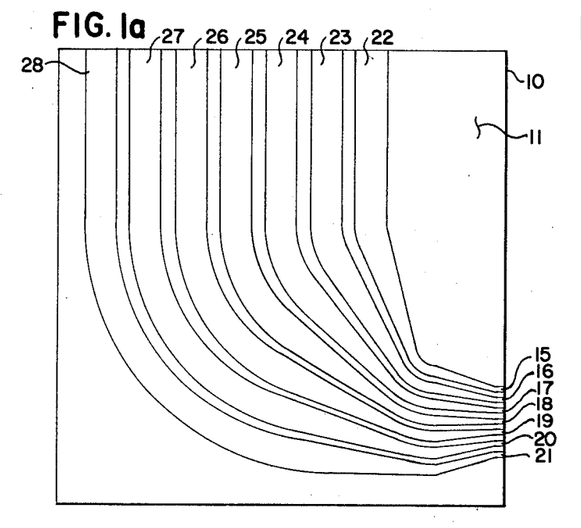
FIGURE 1a is a top view of a basic printing unit of this invention showing the supply conductors extending along the surface thereof to the individual resistive printing elements.
Figure 1B:
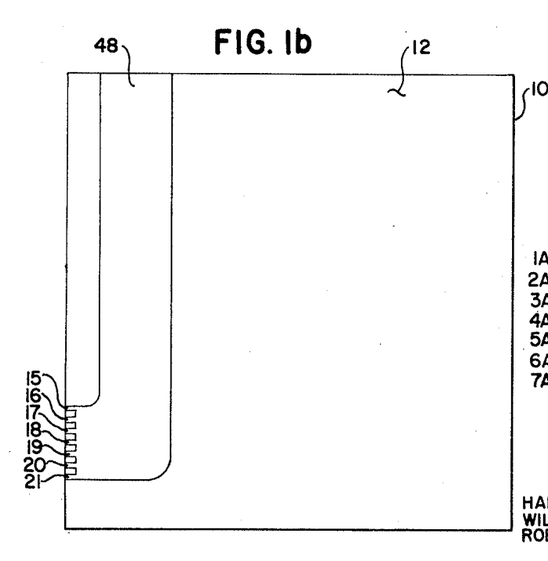
FIGURE 1b is a view of the reverse side of FIGURE 1a, showing a common return conductor extending along the surface thereof.
Figure 1C:
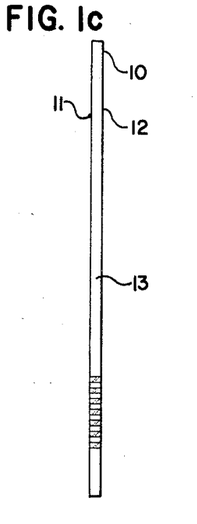
FIGURE 1c is an edge view of FIGURES 1a and 1b showing the edge surface extending between the two plane surfaces and the series of spaced, substantially parallel resistive elements extending thereacross.

Referring to the drawings, FIGURES 1a, 1b, and 1c illustrate the basic printing unit of applicants' novel contribution, which is readily adaptable to a large variety of high-speed printing arrangements. This basic printing unit is composed of a thin wafer 10 of high resistivity substrate material having a first plane surface 11 (FIGURE 1a), a second plane surface 12 (FIGURE 1b), and an edge surface 13 (FIGURE 1c), extending between the two plane surfaces 11 and 12. The high resistivity substrate material of wafer 10 may be an insulating material such as glass, or it may be one of the semi-conductor materials such as silicon. It may be noted that the thin wafer 10 is illustrated as being substantially square in FIGURES 1a and 1b; however, any desirable shape may be employed, depending upon the application to which the units are to be adapted, the only requirement being that the edge surface extending between the two plane surfaces be readily accessible. The dimensions of the wafer 10 are discretionary; however, the thickness is generally determined by the size of the print desired. In practice, a wafer of substrate material one inch square and .020 inch thick was found to be satisfactory for printing characters 5/32 inch high and 3/32 inch wide.

Extending across the edge surface 13 from the plane surface 11 to the other plane surface 12 is a series of spaced, substantially parallel resistive elements 15, 16, 17, 18, 19, 20, and 21. It is to be specifically understood, however, that the number of these resistive elements is not necessarily limited to seven, as any other suitable number may be used. These resistive elements may be applied to the edge surface 13 by a variety of methods such as adhesives or vacuum deposition, or, perhaps, by diffusion of impurities into the surface should the substrate material of wafer 10 be of a semi-conductor material such as silicon.

During the printing operation, the record material must be in cooperative relationship with the resistive elements. Therefore, the conductor selected for the resistive elements should be of a hard material to resist abrasion. In a practical application, tin oxide was found to be a satisfactory material from the standpoint of both abrasion and electrical resistance characteristics.

Extending along the plane surface 11 of the basic printing unit wafer 10 (FIGURE 1a) are supply conductors 22, 23, 24, 25, 26, 27, 28 for each of the respective resistive elements 15, 16, 17, 18, 19, 20, and 21. These supply conductors may be of any low-resistance conductive material such as silver or copper and may be applied to the plane surface 11 by use of well-known printed circuit techniques or by vacuum deposition techniques also well known in the art. Should the substrate material of wafer 10 be one of the semi-conductor materials such as silicon, the supply leads of metal or other low-resistivity material may be diffused into the wafer material by known techniques.

On the opposite plane surface 12 (FIGURE 1b) is a common return circuit conductor 48. As with the supply conductors, the common return conductor 48 may be of any low-resistance conductive material such as copper or silver and may be applied to plane surface 12 by similar printed circuit, vacuum deposition, or diffusion techniques.

Figure 1D:
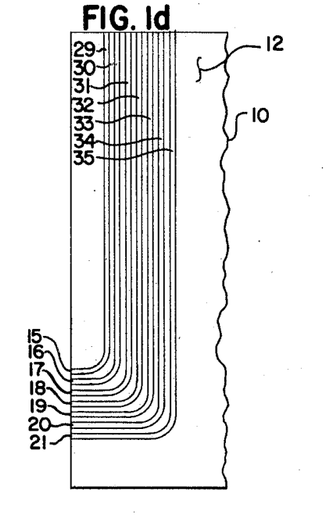
FIGURE 1d is a fragmentary view of the same surface of the unit as FIGURE 1b showing a modified form of return conductor consisting of individual return conductors along the surface thereof for each resistive element.

FIGURE 1d illustrates an alternate arrangement for the return circuit. In this figure, respective separate return conductors 29, 30, 31, 32, 33, 34, and 35 are provided for each of the respective resistive elements 15, 16, 17, 18, 19, 20, and 21. While this arrangement is not the preferred embodiment because of the large number of external conductors required, it has been herein illustrated as an alternative which may be used with applications which require that separate supply and return conductors be provided for each of the resistive elements.

The function of the resistive elements 15, 16, 17, 18, 19, 20, and 21 is to produce heat upon the passage of an electric current therethrough; therefore, the ohmic resistance of each should be in the order of one order of magnitude greater than the supply and return conductor resistance. In practice, a resistance value of 100 ohms was found to be satisfactory. In view of this, the thickness dimension of each resistive element is dictated by the resistance value required. Since not all conductors have the same resistivities, the thickness of these elements will vary depending upon the conductor material employed. With tin oxide as the material used for the resistive elements, a thickness of 3000 Angstrom units was found to be satisfactory.

Figure 3:
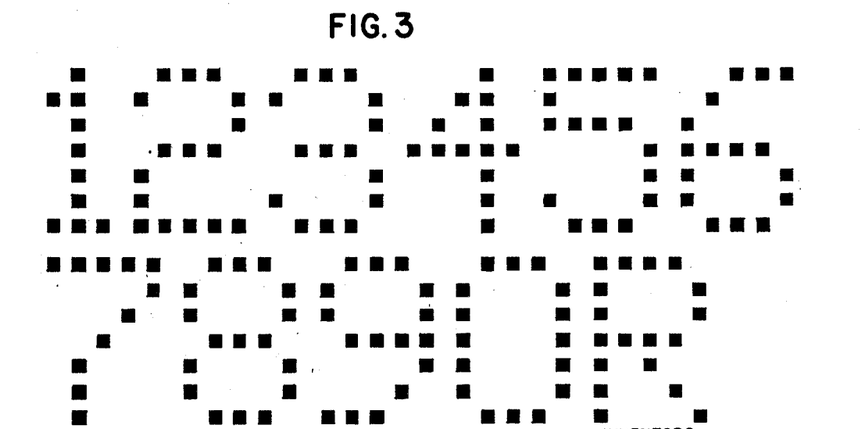
FIGURE 3 is an example of the characters printed by the stacked array printing head of FIGURE 2, FIGURES 4a and 4b, when arranged as shown in FIGURE 4c, set forth a schematic wiring diagram of a circuit for effecting character-at-a-time printing with a stacked array printing head of five units as shown in FIGURE 2.

This novel unit effects printing by outlining the characters to be printed as a series of dots on the record material, as illustrated in FIGURE 3. The legibility of the characters improves, therefore, as the outline of dots approaches the outline of a continuously-written character. This ideal outline is more closely approached as the spacing between adjacent elements is reduced. In view of this, probably the most satisfactory characters are printed by units having resistive elements of a width dimension equal to the length dimension and as closely spaced as is practical without physical contact between adjacent elements. In the interest of drawing clarity, the spacing between the elements has been exaggerated in the pertinent figures. It is to be understood, however, that these dimension ratios are not mandatory for the success of this novel unit.

By applying a short-duration electrical pulse to any one or all of the supply conductors 22, 23, 24, 25, 26, 27, or 28, the resulting current flow through the corresponding resistive elements will produce therein a temperature rise of sufficient magnitude to produce a mark in the form of a dot on thermally-sensitive record material located in cooperative relationship therewith.

Figure 2:
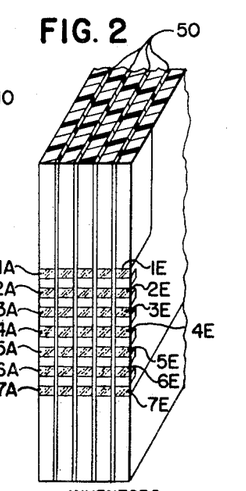
FIGURE 2 is a fragmentary view, partly in cross-section, of five of the basic units shown in FIGURES 1a through 1c, arranged in a stacked array printing head wherein the resistive elements are arranged in columns and rows to form a matrix.

It has been found that all of the letters of the alphabet and the numerical digits may be readily formed with thirty-five resistive elements arranged in a matrix of five columns of seven resistive elements per column. Therefore, the novel printing unit of this invention is readily adaptable to the fabrication of a character-at-a-time printing head by arranging five units into a stacked array, as illustrated in FIGURE 2. To provide electrical insulation between adjacent resistive elements and adjacent supply and return conductors, thin, flexible dielectric spacers 50 may be inserted between adjacent units. With the five-by-seven matrix of resistive elements thus formed, each character may be outlined as a series of dots, as illustrated in FIGURE 3, by selectively energizing, with a short-duration electrical pulse, the proper resistive elements through their associated supply and return conductors while a thermally-sensitive record material is in cooperative relationship therewith.

Figures 4A, 4C:
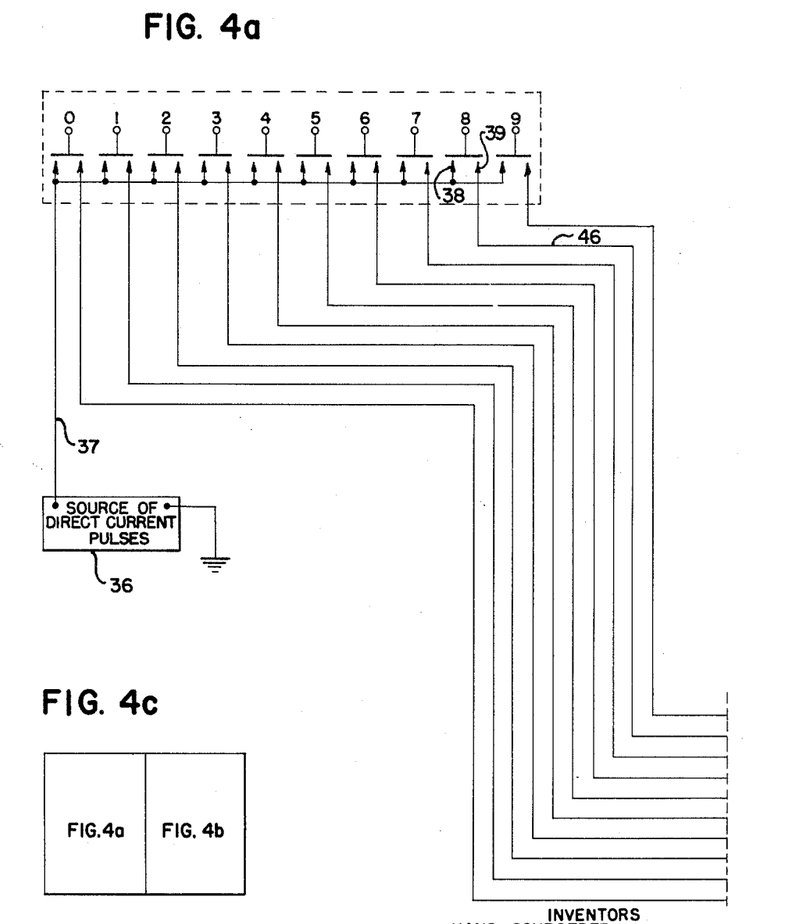
Figure 4B:
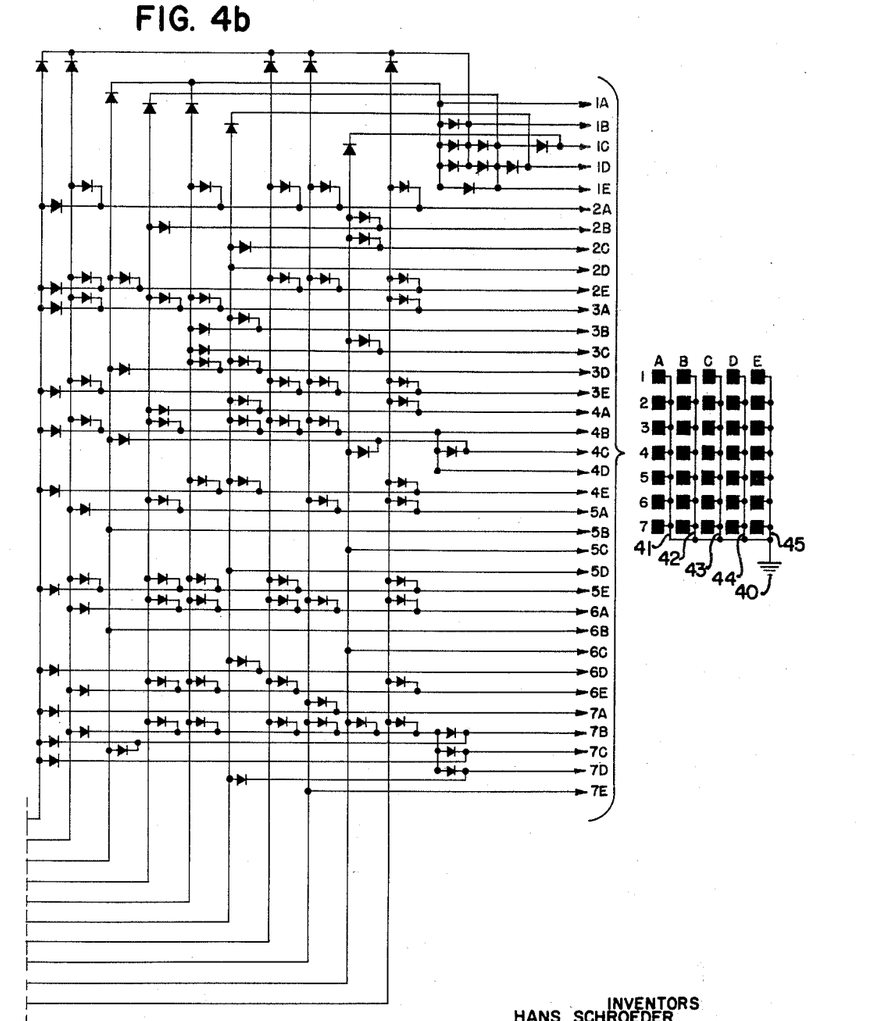

Referring now to FIGURE 4, there is schematically illustrated a circuit for printing each one of the numerical digits 0 through 9, by a character-at-a-time printing head made up of a stacked array of five basic printing units, as illustrated in FIGURE 2, to provide a five-by-seven matrix of resistive elements. To reduce drawing complexity, the stacked array printing head of FIGURE 2 has been illustrated schematically in FIGURE 4 with the resistive elements represented as black squares. To facilitate the description, the columns of resistive elements have been identified as A, B, C, D, and E, respectively, while the rows of resistive elements have been identified as 1, 2, 3, 4, 5, 6, and 7, respectively. Referring to FIGURE 3, to produce the numerical digit 8, for example, it is necessary that the resistive elements 1B, C, and D; 2A and E; 3A and E; 4B, C, and D; 5A and E; 6A and E; and 7B, C, and D be energized by a short-duration electrical pulse from the short-duration electrical pulse source 36 (FIGURE 4a). Since the pulse source 36 forms no part of this invention and may be any one of the short-duration pulse circuits well known in the art, such as a one-shot multivibrator, for example, it has been herein illustrated in block form. The output of the pulse source 36 is connected through the line 37 to the common terminal of each of ten double-pole, single-throw electrical switches, which may be of the push-button type or may be of the key stem type which are common to adding machines, typewriters, etc. For the sake of drawing clarity, the double-pole, single-throw switches have been schematically illustrated and have been labeled 0 through 9, respectively, indicating the numerical digit which they represent. The other terminal of each one of these switches is connected to the resistive elements of the five-by-seven matrix of the stacked array printing head which are required to be energized to print the numerical digit which each represents. For example, the source 36 of short-duration pulses is connected through the line 37 to the common terminal 38 of the double-pole, single-throw switch corresponding to the digit 8, while the other terminal 39 of the switch 8 is connected to the resistive elements 1B, C, and D; 2A and E; 3A and E; 4B, C, and D; 5A and E; 6A and E; and 7B, C, and D, which are returned to point of reference potential 40 through their common return conductors 41, 42, 43, 44, and 45. This character circuit may be traced from terminal 39 of switch 8 through line 46 and the matrix conductors 1B, 1C, 1D, 2A, 2E, 3A, 3E, 4B, 4D, 5A, 5E, 6A, 6E, 7B, 7C and 7D. To avoid the confusion which would arise if the matrix supply conductors were indicated as being connected to their proper resistive elements, they have been labeled in this figure. That is, the conductor labeled 1A is connected to resistive element 1A and to point of reference potential 40, conductor 5B is connected to resistive element 5B and returned to point of reference potential 40, and so through the remainder of the matrix supply conductors. The diodes which appear in this circuitry are necessary for isolating the circuit of each character from the circuit of every other character. By tracing the remainder of the character circuits from the switches corresponding to the numerical digits through this circuitry, it may be found that each of the numerical digits may be printed as an outline of dots by depressing the proper switch corresponding thereto as follows:

The numerical digit 0 is formed by energizing elements 1B, 1C, 1D, 2A, 2E, 3A, 3E, 4A, 4E, 5A, 5E, 6A, 6E, 7B, 7C and 7D.

The numerical digit 1 is formed by energizing elements 1C, 2B, 2C, 3C, 4C, 5C, 6C, 7B, 7C, and 7D.

The numerical digit 2 is formed by energizing elements 1B, 1C, 1D, 2A, 2E, 3E, 4B, 4C, 4D, 5A, 6A, 7A, 7B, 7C, 7D, and 7E.

The numerical digit 3 is formed by energizing elements 1B, 1C, 1D, 2A, 2E, 3E, 4B, 4C, 4D, 5E, 6A, 6E, 7B, 7C, and 7D.

The numerical digit 4 is formed by energizing elements 1D, 2C, 2D, 3B, 3D, 4A, 4B, 4C, 4D, 4E, 5D, 6D, and 7D.

The numerical digit 5 is formed by energizing elements 1A, 1B, 1C, 1D, 1E, 2A, 3A, 3B, 3C, 3D, 4E, 5E, 6A, 6E, 7B, 7C, and 7D.

The numerical digit 6 is formed by energizing elements 1C, 1D, 1E, 2B, 3A, 4A, 4B, 4C, 4D, 5A, 5E, 6A, 6E, 7B, 7C, and 7D.

The numerical digit 7 is formed by energizing elements 1A, 1B, 1C, 1D, 1E, 2E, 3D, 4C, 5B, 6B, and 7B.

The numerical digit 8 is formed by energizing elements 1B, 1C, 1D, 2A, 2E, 3A, 3E, 4B, 4C, 4D, 5A, 5E, 6A, 6E, 7B, 7C, and 7D.

The numerical digit 9 is formed by energizing elements 1B, 1C, 1D, 2A, 2E, 3A, 3E, 4B, 4C, 4D, 4E, 5E, 6D, 7A, 7B, and 7C.

The latters of the alphabet may be similarly formed by providing a respective key for each and correctly wiring each key to the proper resistive elements of the printing head.

It has been found that electrical pulses of 15 milliseconds in width and of 200 milliamperes magnitude have been sufficient to produce upon thermally-sensitive record material the selected characters outlined as a series of dots, each of which dots corresponds to an energized resistive element.

Figure 5:
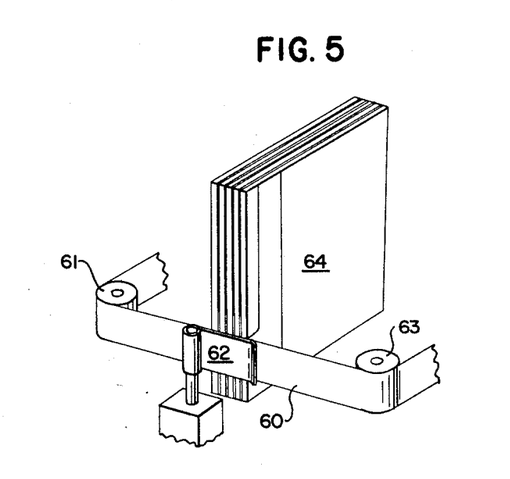
FIGURE 5 is a fragmentary view of one form of apparatus for passing thermally-sensitive record material across the stacked array of FIGURE 2.

In FIGURE 5 there is shown a method of using a stacked array printing head of five printing units to form a strip printer. A strip of thermally-sensitive paper 60 is passed over a roll 61 and beneath a retainer 62, which keeps it in intimate contact with the resistive element matrix of the printing head 64, and out over a roll 63 to a take-up reel, not shown. As the mechanism for driving the paper strip 60 by the printing head 64 forms no part of this invention, and may be any of the many conventional means by which a strip printer operates, it has not been shown in the drawing.

It is readily apparent that each of the characters illustrated in FIGURE 3 may be printed serially by using only one basic printing unit and moving the record material relative to the unit while the proper resistive elements are energized in each position. For example, to print the numerical digit 2 with one unit, it is only required that resistive elements 2A, 5A, 6A, and 7A be energized in the first position; elements 1B, 4B, and 7B in the second position; elements 1C, 4C, and 7C in the third position; elements 1D, 4D, and 7D in the fourth position; and elements 2E, 3E, and 7E in the fifth position. Continuous motion of the record material is possible, and desirable, during this printing operation, or the record material may be successively stepped past the printing head.

By extending the stacked array of printing units and their dielectric spacers to a width equal to or slightly greater than the width of the record material upon which the printing is to be effected, the novel contribution may be employed as a line-at-a-time printer, or, by ganging the stacked arrays to a depth of a printed page, a page-at-a-time printer would be possible.

Depending on the type of printer desired, the novel printing unit of this invention is readily adaptable to serially print each character by using a single unit which prints successive portions of each character as the record material is moved relative thereto, or, by arranging the units in a stacked array, a character at a time may be printed, or, by extending the stacked array with a sufficient number of units to extend across the width of the record material upon which the printing is to be accomplished, a line at a time may be printed.

FIGURES 6 through 10 show an alternate arrangement for a printing head which, though not structurally identical, functions in a manner similar to the stacked array character-at-a-time printing head of FIGURE 2 and, of course, incorporates the principles of this invention.

With this embodiment, the resistive elements are located upon a unit substrate member 66. As with the basic printing unit illustrated in FIGURES 1a, 1b, 1c, and 2, this substrate member 66 is of a high resistivity material and may be an insulating material such as glass or a semi-conductor material such as silicon.

Figure 9:
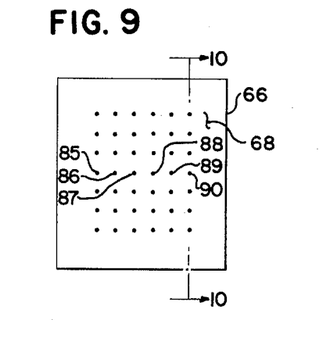
FIGURE 9 is a top view of the alternate printing head arrangement with the resistive element strips removed, showing the arrangement of supply and return conductors.
Figure 10:
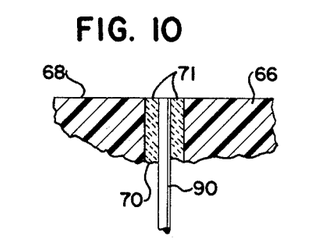
FIGURE 10 is an enlarged, fragmentary view of a section of FIGURE 9 taken along line 10—10 and looking in the direction of the arrows.

The supply and return conductors of this embodiment may be conventional conductor wires which extend through holes provided through the substrate member 66 from the plane surface 67 to the opposite plane surface 68, where they terminate as points arranged in six columns and seven rows, or a total of forty-two conductors, as illustrated in FIGURE 9. Of course, these conductors are extended beyond the plane surface 67 and are connected, through a proper switching arrangement, to a conventional short-duration pulse source, such as a one-shot multivibrator, in a manner similar to the circuitry of FIGURES 4a and 4b. FIGURE 10 is an enlarged, fragmentary view in cross section of a portion of substrate member 66 taken along line 10—10 of FIGURE 9, showing one of the conductors through the substrate member 66. The conductor wire 90 extends through the hole 70 and is securely held in place by a surrounding layer of solder 71.

In a practical unit of this embodiment, a substrate member of insulating material of the glass-filled mica type approximately ¾" x ⅜" x ³⁄₁₆" was provided with supply and return conductors of A.W.G. size 34.

With the supply and return conductors in place, the surface area 68 may be coated with a layer of the material selected for the resistive elements. This layer of resistive element material may be applied to the surface area 68 by conventional techniques such as cathodic sputtering, for example. After the layer of resistive material has been applied to the surface area 68, the unwanted portions are removed by a milling operation or one of several other techniques which are well known in the art of manufacturing printed circuits.

Figure 6:
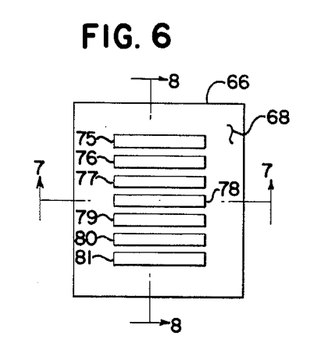
FIGURE 6 is a top view of an alternate printing head arrangement.
Figure 7:
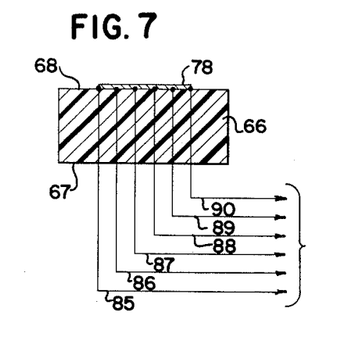
FIGURE 7 is a section view through FIGURE 6 taken along line 7—7 and looking in the direction of the arrows.
Figure 8:
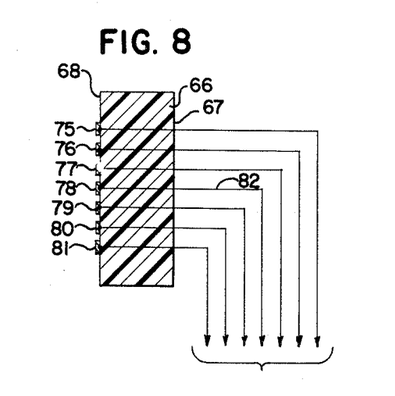
FIGURE 8 is another section view through FIGURE 6 taken along line 8—8 and looking in the direction of the arrows.

FIGURES 6, 7, and 8 illustrate the printing head of this embodiment after the unwanted portions of the layer of resistive element material have been removed from a peripheral area around the conductors and from between the rows of conductors, leaving a series of substantially parallel strips 75, 76, 77, 78, 79, 80, and 81 of resistive element material extending horizontally, in FIGURE 6, across the substrate member 66.

The intimate contact between the layer of resistive element material and the ends of the conductors which terminate on the plane surface 68 provides the electrical connection between the supply and return conductors and the resistive element strips. These electrical connections are illustrated in FIGURES 7 and 8 as solid dots.

This arrangement effectively provides a five-by-seven matrix of resistive elements similar to that provided by the stacked array printing head illustrated in FIGURE 2. Referring to FIGURE 7, the increments of strip 78 included between conductor pairs 85 and 86, 86 and 87, 87 and 88, 88 and 89, and 89 and 90 each comprises a resistive element for a total of five per strip. As there are seven strips, there are a total of thirty-five resistive elements arranged in a five-by-seven matrix. Although each resistive element in each row is not discrete, as with the printing head illustrated in FIGURE 2, it is apparent that current will flow only between energized pairs of conductors. For example, should only conductors 82 and 83 of strip 78 be energized, current would flow only through that increment of resistive material between these two conductors. Therefore, the temperature of only this increment of strip 78 is raised to a magnitude sufficient to produce a mark on thermally-sensitive record material in cooperative relationship therewith. To print with the head of this embodiment, the resistive elements required to outline a selected character are energized through circuitry which may be similar to that illustrated in FIGURE 4.

Alternatively, the resistive material may be removed from between the columns of conductors rather than from between the rows, as shown in the drawings. To produce a similar five-by-seven matrix with this alternative, however, five columns of eight conductors per column are required, rather than six columns of seven conductors per column, as shown in FIGURE 9, to provide the necessary seven increments or resistive elements per strip of resistive element material.

While a preferred embodiment of the present invention has been shown and described, it will be obvious to those skilled in the art that various modifications and substitutions may be made without departing from the spirit of the invention, which is to be limited only within the scope of the appended claims.

What is claimed is:

1. A printing head for thermally marking a thermally-sensitive record material comprising a substrate member of high resistivity material having at least one plane surface, a plurality of resistive elements selectively positioned upon said plane surface, and a pair of electrical conductors extending through said substrate member for each of said resistive elements whereby the passage of a short-duration electrical pulse through said electrical conductor pairs will produce in the corresponding resistive element a temperature rise of sufficient magnitude to produce a mark on thermally-sensitive record material in cooperative relationship therewith.

2. A printing head for thermally marking a thermally-sensitive record material comprising a substrate member of high resistivity material having at least one plane surface, a plurality of resistive elements selectively positioned upon said plane surface in the form of a matrix of columns and rows, and a pair of electrical conductors supported by said substrate member for each of said resistive elements whereby the passage of a short-duration electrical pulse through said electrical conductor pairs will produce in the corresponding resistive element a temperature rise of sufficient magnitude to produce a mark on thermally-sensitive record material in cooperative relationship therewith.

3. A printing unit for thermally marking a thermally-sensitive record material comprising a thin wafer substrate of high resistivity material having two plane surfaces and at least one edge surface extending between the said plane surfaces, a series of spaced, substantially parallel resistive elements each extending across said edge surface from one of said plane surfaces to the other of said plane surfaces, and an electrical conducting circuit of a material different from that of said resistive elements for each of said resistive elements having the supply conductor adhered to one of said surface areas and the return conductor adhered to the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally-sensitive record material in cooperative relationship therewith.

4. A printing unit for thermally marking a thermally-sensitive record material comprising a thin wafer substrate of high resistivity material having two plane surfaces and at least one edge surface extending between the said plane surfaces, a series of spaced, substantially parallel resistive elements each extending across said edge surface from one of said plane surfaces to the other of said plane surfaces, and an electrical conducting circuit of a material different from that of said resistive elements for each of said resistive elements having respective supply conductors adhered to one of said surface areas and a common return conductor adhered to the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally-sensitive record material in cooperative relationship therewith.

5. A printing unit for thermally marking a thermally-sensitive record material comprising a thin wafer substrate of insulating material having two plane surfaces and at least one edge surface extending between the said plane surfaces, a series of spaced, substantially parallel resistive elements each extending across said edge surface from one of said plane surfaces to the other of said plane surfaces, and an electrical conducting circuit of a material different from that of said resistive elements for each of said resistive elements having the supply conductor adhered to one of said surface areas and the return conductor adhered to the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally-sensitive record material in cooperative relationship therewith.

6. A printing unit for thermally marking a thermally-sensitive record material comprising a thin wafer substrate of insulating material having two plane surfaces and at least one edge surface extending between the said plane surfaces, a series of spaced, substantially parallel resistive elements each extending across said edge surface from one of said plane surfaces to the other of said plane surfaces, and an electrical conducting circuit of a material different from that of said resistive elements for each of said resistive elements having a respective supply conductor adhered to one of said surface areas and a common return conductor adhered to the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally-sensitive record material in cooperative relationship therewith.

7. A printing unit for thermally marking a thermally-sensitive record material comprising a thin wafer substrate of semi-conductor material having two plane surfaces and at least one edge surface extending between the said plane surfaces, a series of spaced, substantially parallel resistive elements each extending across said edge surface from one of said plane surfaces to the other of said plane surfaces, and an electrical conducting circuit of a material different from that of said resistive elements for each of said resistive elements having the supply conductor adhered to one of said surface areas and the return conductor adhered to the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally-sensitive record material in cooperative relationship therewith.

8. A printing unit for thermally marking a thermally-sensitive record material comprising a thin wafer substrate of semi-conductor material having two plane surfaces and at least one edge surface extending between the said plane surfaces, a series of spaced, substantially parallel resistive elements each extending across said edge surface from one of said plane surfaces to the other of said plane surfaces, and an electrical conducting circuit of a material different from that of said resistive elements for each of said resistive elements having a respective supply conductor adhered to one of said surface areas and a common return conductor adhered to the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally-sensitive record material in cooperative relationship therewith.

9. A printing head for thermally printing a character at a time on thermally-sensitive record material comprising a stacked array of a plurality of thin wafers of high resistivity material, each of which wafers has two plane surfaces and at least one edge surface extending between the said plane surfaces, a series of spaced, substantially parallel resistive elements each extending across said edge surface from one of said plane surfaces to the other of said plane surfaces, an electrically conductive supply conductor for each of said resistive elements extending along one of said surface areas, and an electrically conductive return conductor for each of said resistive elements extending along the other of said plane surfaces, said wafers being stacked in such a manner that the said resistive elements are arranged in columns and rows wherein the number of said resistive elements in a column corresponds to the number of said resistive elements per wafer and the number of said resistive elements in a row corresponds to the number of wafers in the stacked array, a thin dielectric spacer between adjacent ones of said wafers and electrical circuit leads connected to each pair of supply and return conductors for each resistive element whereby the character to be printed may be outlined as a series of dots by energizing selected pairs of said electrical circuit leads with a short-duration electrical pulse which produces in the corresponding resistive elements a temperature rise of sufficient magnitude to produce marks in the form of respective dots on thermally-sensitive record material in cooperative relationship therewith.

10. A printing head for thermally printing a character at a time on thermally-sensitive record material comprising a stacked array of a plurality of thin wafers of high resistivity material, each of which wafers has two plane surfaces and at least one edge surface extending between the said plane surfaces, a series of spaced, substantially parallel resistive elements each extending across said edge surface from one of said plane surfaces to the other of said plane surfaces, an electrically conductive supply conductor for each of said resistive elements extending along one of said surface areas, a common electrically conductive return conductor for all of said resistive elements extending along the other of said plane surfaces, said wafers being stacked in such a manner that the said resistive elements are arranged in columns and rows wherein the number of said resistive elements in a column corresponds to the number of said resistive elements per wafer and the number of said resistive elements in a row corresponds to the number of wafers in the stacked array, a thin dielectric spacer between adjacent ones of said wafers, and electrical circuit leads connected to each pair of supply and return conductors for each resistive element whereby the character to be printed may be outlined as a series of dots by energizing selected pairs of said electrical circuit leads with a short-duration electrical pulse which produces in the corresponding resistive elements a temperature rise of sufficient magnitude to produce marks in the form of respective dots on thermally-sensitive record material in cooperative relationship therewith.

11. A printing head for thermally printing a character at a time on thermally-sensitive record material comprising a stacked array of a plurality of thin wafers of insulating material, each of which wafers has two plane surfaces and at least one edge surface extending between the said plane surfaces, a series of spaced, substantially parallel resistive elements each extending across said edge surface from one of said plane surfaces to the other of said plane surfaces, an electrically conductive supply conductor for each of said resistive elements extending along one of said surface areas, an electrically conductive return conductor for each of said resistive elements extending along the other of said plane surfaces, said wafers being stacked in such a manner that the said resistive elements are arranged in columns and rows wherein the number of said resistive elements in a column corresponds to the number of said resistive elements per wafer and the number of said resistive elements in a row corresponds to the number of wafers in the stacked array, a thin dielectric spacer between adjacent ones of said wafers, and electrical circuit leads connected to each pair of supply and return conductors for each resistive element whereby the character to be printed may be outlined as a series of dots by energizing selected pairs of said electrical circuit leads with a short-duration electrical pulse which produces in the corresponding resistive elements a temperature rise of sufficient magnitude to produce marks in the form of respective dots on thermally-sensitive record material in cooperative relationship therewith.

12. A printing head for thermally printing a character at a time on thermally-sensitive record material comprising a stacked array of a plurality of thin wafers of insulating material, each of which wafers has two plane surfaces and at least one edge surface extending between the said plane surfaces, a series of spaced, substantially parallel resistive elements each extending across said edge surface from one of said plane surfaces to the other of said plane surfaces, an electrically conductive supply conductor for each of said resistive elements extending along one of said surface areas, a common electrically conductive return conductor for each of said resistive elements extending along the other of said plane surfaces, said wafers being stacked in such a manner that the said resistive elements are arranged in columns and rows wherein the number of said resistive elements in a column corresponds to the number of said resistive elements per wafer and the number of said resistive elements in a row corresponds to the number of wafers in the stacked array, a thin dielectric spacer between adjacent ones of said wafers, and electrical circuit leads connected to each pair of supply and return conductors for each resistive element whereby the character to be printed may be outlined as a series of dots by energizing selected pairs of said electrical circuit leads with a short-duration electrical pulse which produces in the corresponding resistive elements a temperature rise of sufficient magnitude to produce marks in the form of respective dots on thermally-sensitive record material in cooperative relationship therewith.

13. A printing head for thermally printing a character at a time on thermally-sensitive record material comprising a stacked array of a plurality of thin wafers of semi-conductor material, each of which wafers has two plane surfaces and at least one edge surface extending between the said plane surfaces, a series of spaced, substantially parallel resistive elements each extending across said edge surface from one of said plane surfaces to the other of said plane surfaces, an electrically conductive supply conductor for each of said resistive elements extending along one of said surface areas, an electrically conductive return conductor for each of said resistive elements extending along the other of said plane surfaces, said wafers being stacked in such a manner that the said resistive elements are arranged in columns and rows wherein the number of said resistive elements in a column corresponds to the number of said resistive elements per wafer and the number of said resistive elements in a row corresponds to the number of wafers in the stacked array, a thin dielectric spacer between adjacent ones of said wafers, and electrical circuit leads connected to each pair of supply and return conductors for each resistive element whereby the character to be printed may be outlined as a series of dots by energizing selected pairs of said electrical circuit leads with a short-duration electrical pulse which produces in the corresponding resistive elements a temperature rise of sufficient magnitude to produce marks in the form of respective dots on thermally-sensitive record material in cooperative relationship therewith.

14. A printing head for thermally printing a character at a time on thermally-sensitive record material comprising a stacked array of a plurality of thin wafers of semi-conductor material, each of which wafers has two plane surfaces and at least one edge surface extending between the said plane surfaces, a series of spaced, substantially parallel resistive elements each extending across said edge surface from one of said plane surfaces to the other of said plane surfaces, an electrically conductive supply conductor for each of said resistive elements extending along one of said surface areas, a common electrically conductive return conductor for each of said resistive elements extending along the other of said plane surfaces, said wafers being stacked in such a manner that the said resistive elements are arranged in columns and rows wherein the number of said resistive elements in a column corresponds to the number of said resistive elements per wafer and the number of said resistive elements in a row corresponds to the number of wafers in the stacked array, a thin dielectric spacer between adjacent ones of said wafers, and electrical circuit leads connected to each pair of supply and return conductors for each resistive element whereby the character to be printed may be outlined as a series of dots by energizing selected pairs of said electrical circuit leads with a short-duration electrical pulse which produces in the corresponding resistive elements a temperature rise of sufficient magnitude to produce marks in the form of respective dots on thermally-sensitive record material in cooperative relationship therewith.

15. A printing head for thermally printing a character at a time on thermally-sensitive record material comprising a substrate member of high resistivity material having at least one plane surface, a plurality of resistive elements positioned upon said plane surface in the form of a plurality of substantially parallel strips, and a plurality of electrical conductors extending through said substrate member and spaced along each of said parallel strips, the increments of said parallel strips located between adjacent pairs of said conductors each comprising a resistive element having as supply and return conductors the conductor pair between which each is located, said resistive elements being arranged in columns and rows upon said plane surface wherein the number of said resistive elements in a row corresponds to the number of said increments between said conductor pairs and the number of said resistive elements per column corresponds to the number of said substantially parallel strips whereby the character to be printed may be outlined as a series of dots by selectively energizing said conductor pairs with a short-duration electrical pulse which produces in the corresponding resistive elements a temperature rise of sufficient magnitude to produce marks in the form of respective dots on thermally-sensitive record material in cooperative relationship therewith.

16. A printing head as described in claim 15 having a substrate member of an insulating material.

17. A printing head as described in claim 15 having a substrate member of a semi-conductor material.

18. The printing unit described in claim 6 in which each of said resistive elements is a thin film of resistive material secured to said edge surface by an adhesive material.

19. A printing unit for thermally marking a thermally sensitive record material comprising a thin wafer of high resistivity material having two plane surfaces and at least one edge surface extending between the said plane surfaces, a series of spaced, substantially parallel resistive elements each comprising a thin film of tin oxide material and extending across said edge surface from one of said plane surfaces to the other of said plane surfaces and an electrical conducting circuit for each of said resistive elements having the supply conductor extending along one of said surface areas and the return conductor extending along the opposite of said surface areas of said wafer whereby the passage of a short duration electrical pulse through said electrical conducting circuits will produce in the corresponding resistive elements a temperature rise of sufficient magnitude to produce marks in the form of respective dots on thermally sensitive record material in cooperative relationship therewith.

20. A printing unit for thermally marking a thermally sensitive record material comprising a thin wafer of high resistivity material having two plane surfaces and at least one edge surface extending between the said plane surfaces, a series of spaced, substantially parallel resistive elements each comprising a thin film deposit of resistive material and extending across said edge surface from one of said plane surfaces to the other of said plane surfaces and an electrical conducting circuit for each of said resistive elements having respective supply conductors extending along one of said surface areas and a common return conductor extending along the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally sensitive record material in cooperative relationship therewith.

21. A printing unit for thermally marking a thermally sensitive record material comprising a thin wafer of insulating material having two plane surfaces and at least one edge surface extending between the said plane surfaces, a series of spaced, substantially parallel resistive elements each comprising a vacuum-deposited thin film of resistive material and extending across said edge surface from one of said plane surfaces to the other of said plane surfaces, and an electrical conducting circuit for each of said resistive elements having the supply conductor extending along one of said surface areas and the return conductor extending along the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally sensitive record material in cooperative relationship therewith.

22. A printing unit for thermally marking a thermally sensitive record material comprising a thin wafer of semi-conductor material having two plane surfaces and at least one edge surface extending between the said plane surfaces, a series of spaced, substantially parallel resistive elements each comprising an impurity diffused into the said edge surface of the semi-conductor material wafer and extending across said edge surface from one of said plane surfaces to the other of said plane surfaces, and an electrical conducting circuit for each of said resistive elements having the supply conductor extending along one of said surface areas and the return conductor extending along the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally sensitive record material in cooperative relationship therewith.

23. A printing unit for thermally marking a thermally sensitive record material comprising a thin wafer of semi-conductor material having two plane surfaces and at least one edge surface extending between the said plane surfaces, a series of spaced, substantially parallel resistive elements each comprising an impurity diffused into the said edge surface of the semi-conductor material wafer and extending across said edge surface from one of said plane surfaces to the other of said plane surfaces, and an electrical conducting circuit for each of said resistive elements having a respective supply conductor extending along one of said surface areas and a common return conductor extending along the opposite of said surface areas of said wafer whereby the passage of a short-duration electrical pulse through said electrical conducting circuits will produce in the corresponding resistive elements a temperature rise of sufficient magnitude to produce marks in the form of respective dots on thermally sensitive record material in cooperative relationship therewith.

References Cited in the file of this patent
UNITED STATES PATENTS

| | | |
|---|---|---|
| 1,114,612 | Hibbard | Oct. 20, 1914 |
| 1,306,631 | Rogers | June 10, 1919 |
| 2,930,847 | Metzger | Mar. 29, 1960 |
| 2,997,361 | Christopherson et al. | Aug. 22, 1961 |
| 3,023,070 | Benn | Feb. 27, 1962 |

Disclaimer 3,161,457.—*Hans Schroeder*, Bellbrook, *William H. Puterbaugh, Jr.*, Waynesville, and *Robert C. Meckstroth*, Dayton, Ohio. THERMAL PRINTING UNITS. Patent dated Dec. 15, 1964. Disclaimer filed Feb. 7, 1969, by the assignee, *The National Cash Register Company*.

Hereby enters this disclaimer to claims 1 and 2 of said patent.

[*Official Gazette May 27, 1969.*]